United States Patent [19]

Grossner et al.

[11] 4,349,746
[45] Sep. 14, 1982

[54] FREQUENCY GENERATOR

[75] Inventors: Horst Grossner, Berglen; Günter Weiger, Esslingen; Günter Schwegler, Weinstadt, all of Fed. Rep. of Germany

[73] Assignee: Daimler-Benz Aktiengesellschaft, Stuttgart, Fed. Rep. of Germany

[21] Appl. No.: 192,722

[22] Filed: Oct. 1, 1980

[30] Foreign Application Priority Data

Oct. 3, 1979 [DE] Fed. Rep. of Germany ....... 2940083

[51] Int. Cl.³ ............................................ G01R 23/14
[52] U.S. Cl. .................................. 307/106; 324/79 D; 324/83 D; 331/65; 331/181
[58] Field of Search .................. 307/106; 331/65, 181; 324/79 D, 83 D

[56] References Cited

U.S. PATENT DOCUMENTS 4,088,874 5/1978 Hartig ................................ 331/65 X
4,135,243 1/1979 Peregrino et al. ................. 324/79 D Primary Examiner—Michael L. Gellner
Assistant Examiner—James L. Dwyer
Attorney, Agent, or Firm—Craig and Antonelli

[57] ABSTRACT

A frequency generator module has a first generator circuit and a second generator circuit, the frequencies of these circuits being variable by a physical parameter, especially a distance or angular value, with two coils arranged coaxially at a mutual spacing on linear or curved, tubular coil holders, the inductance of these coils being variable by a core displaceable in the coil holder. The combined generator module is connected by a control circuit to a changeover switch which alternately switches the output of one of the two coils to the input of the frequency generator module. A short-circuit ring is arranged in an axially normal plane between the two coils, for the duration of a specific number of pulses of the generator circuit formed from the coil and the generator module. A control and/or regulating device is provided which calculates from certain pulses of successive pulse sequences of the two generator circuits the frequencies (f1; f2) and their difference (f1−f2) and/or a correcting value which is the difference between the actual value and the desired value of the sum total (f1+f2) of the frequencies of the two generator circuits. The corrected frequency difference and/or the value of the physical variable derived therefrom is indicated, or a signal proportional thereto is transmitted.

12 Claims, 5 Drawing Figures

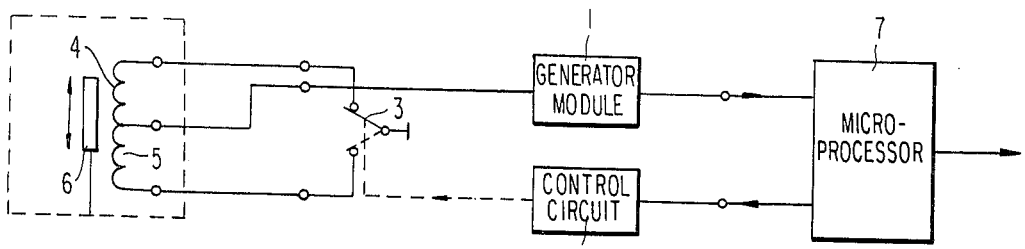
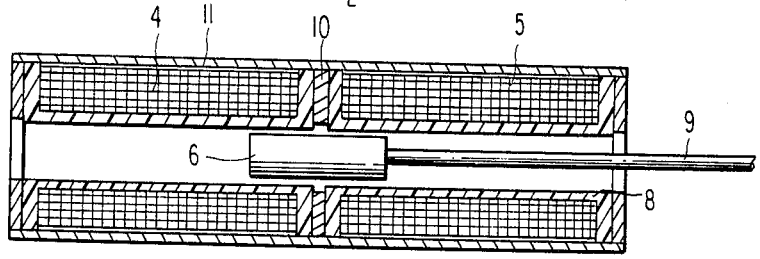
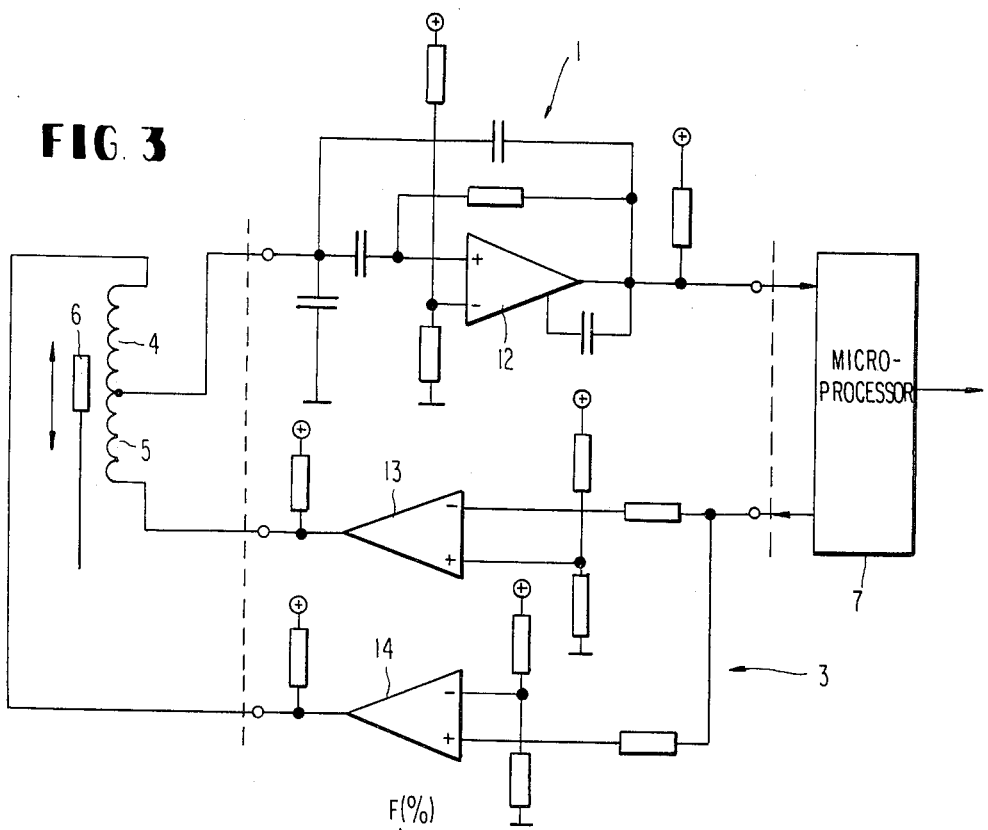
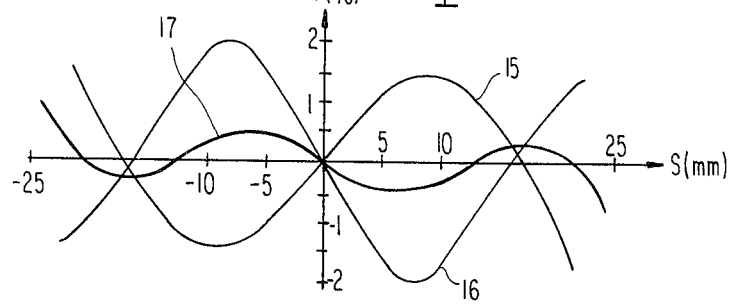

FREQUENCY GENERATOR

The present invention relates to a frequency generator with a first generator circuit and a second generator circuit, the frequencies of these circuits being variable by a geometrical or physical value, especially a distance or angular value, with two coils arranged coaxially at a mutual spacing on linear or curved, tubular coil holders, the inductances of these coils being variable by a core displaceable in the coil holder. Such a device has been described in DAS [German Published Application] No. 2,532,267. The device involves a pulse sequence generator wherein the pulse number of a pulse sequence obtained at the output depends on a geometrical or physical value, which pulse sequence generator can be employed, for example, as a displacement pickup. Although such a circuit is relatively insensitive against temperature and voltage fluctuations, in that it utilizes two generators, it is still susceptible to these influences due to possible structural component tolerances, differing aging processes, and varying influences of the connecting cables in case of spatial separation of coils and generator; consequently, this circuit is too inaccurate for many purposes of application. Sufficient linearity can be attained, in part, at considerable expense, for example, by the use of coils having winding densities varied over the length.

It is an object of the invention to provide a frequency generator exhibiting as compared with the conventional generator a higher measuring accuracy with a substantially lower influence of temperature, voltage, aging of the components, interference fields, etc., and yet having a simple structure, being inexpensive in its manufacture, and being usable universally—in an analog and a digital fashion.

This object has been attained, according to the invention, by providing a combined generator module, which is connected by a control circuit and an alternating changeover switch to one of two coils, between which a short-circuit ring is arranged in an axially normal plane, for the duration of a specific number of pulses of the generator circuit formed from the coil and the generator module; by providing a control and/or regulating device calculating from certain pulses of successive pulse sequences of the two generator circuits the frequencies ($f_1$; $f_2$) and their difference ($f_1 - f_2$) and/or a correcting value, and indicating the corrected frequency difference and/or the geometrical or physical variable derived therefrom, or transmitting a signal proportional thereto.

In accordance with another object of the invention, there is provided a frequency generator with a first generator circuit and a second generator circuit, the frequencies of these circuits being variable by a geometrical or physical value, especially a distance or angular value, with two coils arranged coaxially at a mutual spacing on linear or curved, tubular coil holders, the inductances of these coils being variable by a core displaceable in the coil holder, characterized in that a combined generator module is provided which is connected by a control circuit and a changeover switch alternatingly with one of the two coils, between which a short-circuit ring is arranged in an axially normal plane, for the duration of a specific number of pulses of the generator circuit formed from the coil and the generator module; that a control and/or regulating device is provided calculating from certain pulses of successive pulse sequences of the two generator circuits the frequencies ($f_1$; $f_2$) and their difference ($f_1 - f_2$) and/or a correcting value, and indicating the corrected frequency difference and/or the geometrical or physical variable derived therefrom, or transmitting a signal portional thereto.

In accordance with a further object of the invention, there is provided a frequency generator characterized in that a correcting value therefor is the difference between the actual value and the desired value of the sum total ($f_1 + f_2$) of the frequencies of the two generator circuits.

The solution of using a combined generator module with alternating operation of both coils has the substantial advantage that thereby almost all of the aforementioned disturbing influences act on both measuring pulse series [trains] in the same way and consequently the affects of the disturbing influences are eliminated. Within a specific distance or measuring range, very minor measuring errors result which are linearized by the insertion of a short-circuit ring between the two coils, thereby producing a spatially limited counter field (Lenz's law), and errors are thus considerably reduced. Within the measuring range to be determined, the distance traversed by the coil core is proportional to the difference of the two generator frequencies and, under measuring conditions which remain the same (temperature, voltage, etc.), the sum total of the two generator frequencies is constant. Therefore, a change in these frequency sum totals can serve as a correcting value and can be automatically included in the calculation of the measuring result for the compensation of the measuring error. Advantageously, a microprocessor is utilized as the control and regulating device; this microprocessor in the form of an IC switching circuit can be obtained inexpensively and can also effect the correction of the measuring result, as described above, whereby the measuring error can be kept at a very low value under all conditions.

These and other objects, features, and advantages of the present invention will become more apparent from the following description when taken in connection with the accompanying drawings which show, for the purposes of illustration only, one embodiment in accordance with the present invention, and wherein:

FIG. 1 shows a block circuit diagram of the frequency generator of this invention;

FIG. 2 shows a cross section through a linear displacement pickup;

FIG. 3 shows a circuit diagram of the invention;

FIG. 4 shows a schematic diagram of the measuring errors; and

The details of the invention will be described, making reference to FIGS. 1-5, wherein like reference numerals designate like features of the invention.

Figure 5:
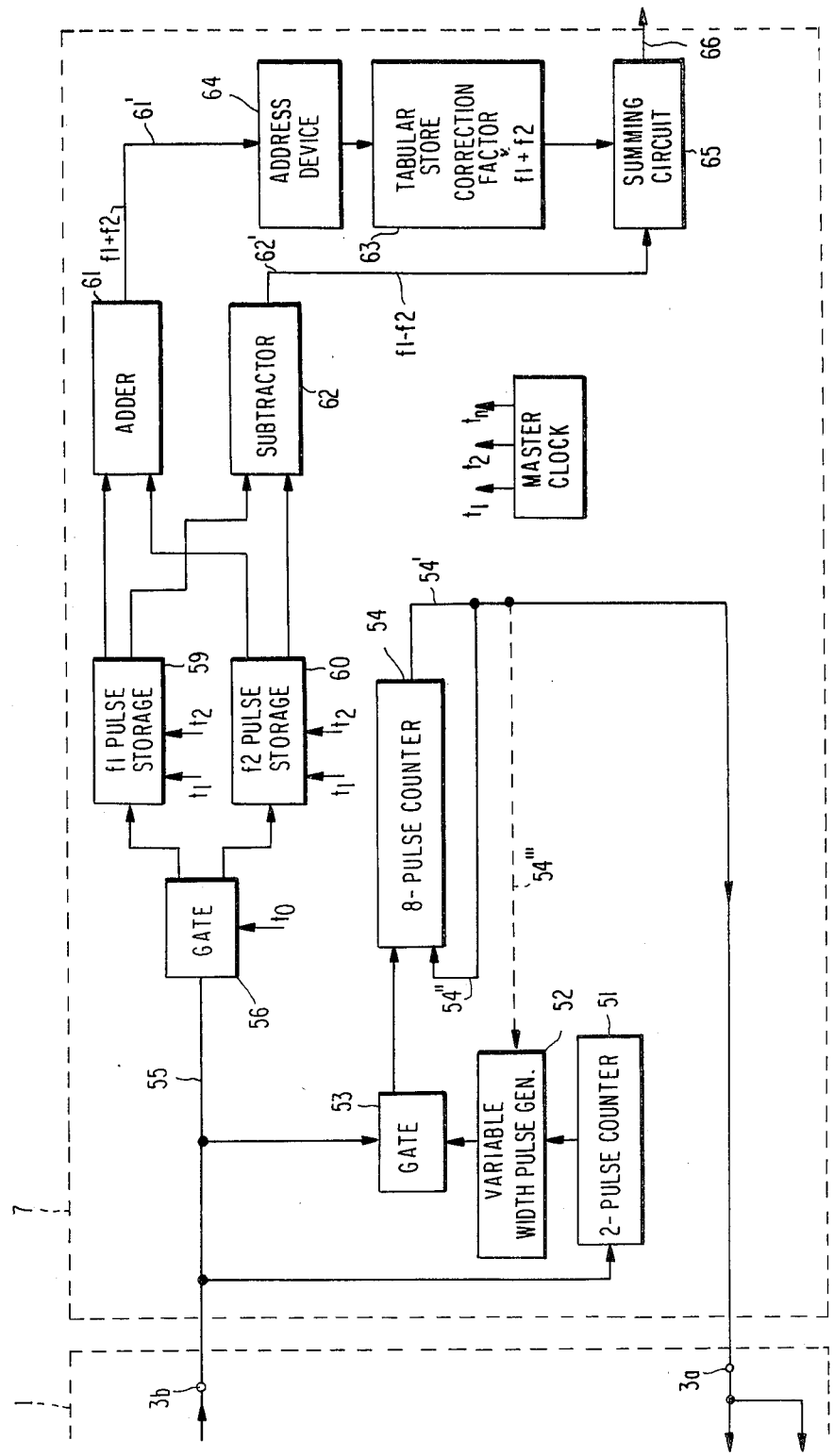
FIG. 5 shows a block diagram of the structure and operations of the microprocessor.

The schematic block circuit diagram of FIG. 1 shows the combined generator module 1 and the control circuit 2, the changeover switch 3, as well as the two coils 4 and 5 and the iron core 6 movable in the coils. A microprocessor 7 receives the pulses generated by the generator circuit consisting of generator module 1 and the respectively inserted coil 4 or 5; processes these pulses and yields a switchover command after a specific number of pulses, which is applied to the control circuit 2. The latter thereupon actuates the changeover switch 3 and prevents the transmission of the initial pulses for measurement. Additional details will follow below in describing the circuit according to FIG. 3.

In FIG. 2, the cross section is illustrated through a linear displacement pickup. The latter consists of the two coils 4 and 5 within a housing 11 arranged coaxially at mutual spacings on linear, tubular coil holders 8 and of the core 6 movable in the coil bodies; this core can be moved axially by an adjusting rod 9. Between the two coils, a short-circuit ring 10 is arranged consisting of an electrically conductive material. The core 6 is illustrated in its central position wherein both coils exhibit identical inductance.

FIG. 3 shows the circuit diagram of one embodiment of the invention. The operational amplifier 12 with its wiring (resistors and capacitors) as the generator module 1 forms, together with the coil 4, the first generator circuit and, together with the coil 5, the second generator circuit, a self-oscillating LC oscillator. The circuit 1 in its two generator configurations produces pulse trains at respective pulse rate frequencies f1 and f2 which are fed to a subsequent microprocessor 7 as the control and regulating device. The microprocessor 7 is programmed so that it counts ten pulses of the frequency f1, and then transmits a switching signal to the electronic changeover switch 3, which latter consists of the two operational amplifiers 13 and 14 with their wiring, whereby in place of the coil 4 at this point the coil 5 is connected to the generator module 1, and pulses of the frequency f2 are transmitted to the microprocessor. The latter now likewise counts ten pulses of the frequency f2 and thereafter transmits another switching signal to again switch over to f1, and so forth.

The two frequencies f1 and f2 are identical if the core 6 is in the central position, and vary linearly in a specific displacement range of the core depending upon its direction of movement, in a positive or negative fashion so that with unchanged operating conditions, such as voltage, temperature, etc., the sum total of both frequencies is constant. In other words, one frequency increases linearly, the other decreases linearly. The difference f1−f2 with its mathematical sign is proportional to the position of the core, based on its central position. This difference is calculated in the microprocessor 7. Of each pulse sequence of ten pulses, the first two pulses are suppressed in this embodiment in order to avoid erroneous measurements, which otherwise would occur due to the transient time [building-up process] of the coils. The residual eight pulses are counted with a substantially higher frequency adapted to the desired measuring accuracy and produced in the microprocessor, and the difference and the sum of the two frequencies f1 and f2 are formed digitally in a conventional manner from the result. That is to say, the pulse rate frequencies f1 and f2 for the respective pulse are determined for a period of time, the length of the period being in accordance with the desired measuring accuracy and the difference and sum of the two frequencies are formed digitally in a conventional manner in the microprocessor. The microprocessor 7 yields a signal proportional to the frequency difference and thus to the core displacement, which signal can be further processed in a digital and/or analog manner. The determination of the frequency difference, however, can also take place by a digital circuit made up of forward/backward counters. With identical coil inductances, an individual adjustment of the displacement pickup can be dispensed with.

The result can be corrected in case of changing operating conditions by adding a correcting value to the issued signal upon the occurrence of a difference of the frequency sum f1+f2, this correcting value being stored in a tabular correlation to the difference of the frequency sum in the microprocessor 7. It is possible in this way to reduce the linearity error to an even greater extent by means of this relatively simple measuring system.

FIG. 4 shows, in a diagram, the relationship of the error F over the measuring distance s. The curve 15 represents the course without short-circuit ring. By the insertion of a short-circuit ring 10, a counter field is produced corresponding to curve 16. The addition of both effects yields a resultant error curve according to curve 17, which with a measuring range of ±5 mm is below 0.3% without error correction. In this connection, the total length of each coil was 25 mm; the thickness of the short-circuit ring was 1 mm; the core length was 11 mm; the generator frequencies in case of a central core position were f1+f2≈6 kHz; the counting frequency was 100 kHz, and the frequency variation was 236 Hz/mm+≦0.05 Hz/mm; °C. in a temperature range from −30° C. to +100° C.

FIG. 5 is a diagram of the operations performed in the microprocessor 7 as it interacts with generator module 1 and control circuit 2. It will be appreciated by those skilled in the art that the microprocessor may be constructed in a variety of ways to perform the functions which FIG. 5 depicts. Thus, individual circuits corresponding to the respective blocks in the circuit diagram of FIG. 5 may be constructed as a hardware form of the processor. Alternatively, the artisan will appreciate that the functions performed as disclosed in FIG. 5 may be achieved by programming a general purpose microprocessor of the character which includes the conventional I/O circuits, memory, arithmetic unit and attendent logic circuits for the control of the microprocessor. Mindful of such alternatives available for practicing the invention, the operations to be performed will now be described in connection with FIG. 5.

It will be assumed that a switching pulse has just been transmitted as output from eight-pulse counter 54 to terminal 3a, the input to the control circuit. Upon such switching taking place, a train of pulses will be presented at output terminal 3b from the pulse generator module 1, which pulses are to be counted in the eight-pulse counter 54. In order to avoid erroneous measurements, it is necessary to suppress the first two pulses. For this purpose, the first two output pulses from terminal 3b are presented as input to a two-pulse counter 51 which, after receiving two pulses, produces an output pulse to actuate a variable width pulse generator 52 which, in turn, opens gate 53. Gate 53, having been closed during the first two pulses from terminal 3b, now accepts the remaining pulses which are transmitted to the eight-pulse counter 54. It will be noted that the eight-pulse counter 54 employs its output on line 54' as the next switching pulse presented to terminal 3a and, also as a reset for counter 54 on line 54". In circumstances where pulse repetition rate frequencies f1 and f2 are of similar magnitude, a single pulse width for the variable width pulse generator 52 may suffice for both frequencies. Those skilled in the art will recognize that if frequencies f1 and f2 are to be allowed to be substantially different, the variable width pulse generator 52 may be controlled between two pulse widths to accommodate the eight pulses respectively of the two frequencies, under the control of a switching pulse from the eight-pulse counter 54 as shown by dotted line 54'''.

The alternating trains of output pulses from terminal 3b are also transmitted over line 55 to gate 56 which distributes the f1 pulses to a storage 59 and the f2 pulses to a storage 60. The switching of gate 56 may be effected, as indicated by input $t_0$, under timing from a master clock 57 of the microprocessor which provides timing outputs for the various operations performed. Alternatively, the switching pulse from the output of 54 may be used to operate gate 56. Storages 59 and 60 may take a variety of configurations and, for example, may be composed of shift registers. At a predetermined time $t_1$, storages 59 and 60 are cleared and, after a period of pulse accumulation, at a predetermined time $t_2$, the respective numbers of pulses standing in 59 and 60 are produced as output to adder 61 and subtractor/comparator 62. Alternatively, as previously explained, devices 59 and 60 may be counters.

The time period $t_2-t_1$ may extend over a plurality of switching cycles of the control circuit 2 or, alternatively, the frequencies f1 and f2 may be based on a measurement employing a time period less than a complete switching cycle, in which case it will be apparent to those skilled in the art that the periods during which each frequency is sampled and measured will occur at different times depending upon which pulse train is being transmitted from terminal 3b. Actuation of switch 3 is dependent upon the same number of pulses, whether of the f1 or f2 signal, and, accordingly, the time period for the pulse train of the lower frequency signal to generate the same number of pulses as generated by the higher frequency pulse train will be longer.

In accordance with well known frequency measurement techniques, measurement of the frequency of two signals of different frequency over the same predetermined time period will establish their relative difference.

Adder 61 produces an output signal representative of the value f1+f2 on line 61'. Subtractor/comparator 62 produces an output representative of the difference of frequencies f1−f2 on line 62'. If no further correction is to be made of the output, that is, corrections such as those due to operating conditions such as voltage, temperature, etc., the output at 62' is representative of the physical variable measured by the position of coil 6 in FIG. 3.

As previously indicated, however, a correction may be made based upon the value of f1+f2. The microprocessor contains a tabular store 63. A table for values of the parameter f1+f2 is correlated against a table of corrections to be applied to the value of f1−f2 to form a final output. It will be appreciated by those skilled in the art that such a table may be programmed into the microprocessor initially and/or alternatively additional or changed values for the parameter f1+f2 and a correlated correction therefor may be subsequently input to the tabular store by way of the I/O facilities of the microprocessor.

Upon presentation of an output at adder 61, of a value for f1+f2 on line 61', the value will be stored in address register 64 which serves as a table lookup for tabular store 63 causing an output to summing circuit 65. Summing circuit 65 also receives the signal representing f1−f2 and performs a summing operation which applies the correction value to the parameter f1−f2 producing a final corrected value on line 66.

The artisan will recognize from the foregoing explanation of FIG. 5 that a variety of ways of achieving the results desired may present themselves of which the foregoing explanation is exemplary only. The essential results to be achieved are the alternate switching of the coils 4 and 5 by the counting of a fixed number of pulses of the two respective pulse repetition rate frequencies, removing the effect of transient time by ignoring a predetermined number of the early pulses in each pulse train, the determination of the value f1+f2 and the value of f1−f2, and the final application of a correction to the value of f1−f2 in accordance with the value of f1+f2 as determined from a tabular store of correction values corresponding to the values which the parameter f1+f2 may take.

In other applications, the possibility for standardizing the measuring result can be offered by providing a dividend. It is also possible to effect an evaluation by means of carrier frequency measuring processes, wherein the displacement pickup (both coils) acts as an inductive voltage divider.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such changes and modifications as are encompassed by the scope of the appended claims.

We claim:

1. A frequency generator comprising a first generator circuit and a second generator circuit, the frequencies of these circuits being variable by a parameter, with two coils arranged coaxially on one of linear and curved tubular coil holders, the inductances of these coils being variable by a core displaceable in the coil holder, a combined generator module connected by a control circuit and a changeover switch alternatingly with one of the two coils between which coils a short-circuit ring is arranged in an axially normal plane, for the duration of a specific number of pulses of the generator circuit formed from the coil and the generator module; and control regulating means for calculating from certain pulses of successive pulse sequences of the two generator circuits the frequencies (f1; f2) and their difference (f1−f2) and a corrected value thereof to indicate the corrected frequency difference and for transmitting a signal proportional thereto.

2. A frequency generator according to claim 1, characterized in that the corrected value is the difference between the actual value and a desired value based upon the sum total (f1+f2) of the frequencies of the two generator circuits.

3. A frequency generator system comprising
plural pulse generators having outputs of pulse frequencies f1 and f2, respectively,
first means for alternately actuating said generators to produce the same predetermined number of pulses,
second means to vary the pulse frequencies f1 and f2 in accordance with a parameter,
third means for determining from the output of said pulse generators the value f1−f2,
fourth means for determining from the output of said pulse generators the value f1+f2, and
fifth means for applying a correction to the value f1−f2 dependent upon the value f1+f2.

4. A frequency generation system as set forth in claim 3, wherein said first means comprises means effective to count said predetermined number of pulses output from said pulse generators only after transient effects produced by said first means have decayed.

5. A frequency generation system as set forth in claim 3, wherein said second means comprises
two coils arranged coaxially,
a core axially displaceable to vary the inductances of said coils in accordance with said parameter.

6. A frequency generation system as set forth in claim 3, wherein said fifth means comprises
sixth means for storing a table of values of $f1+f2$ correlated to values of a correction factor for application to said value $f1-f2$, and
seventh means responsive to said fifth means to select from said sixth means a correction factor value to apply to said value $f1-f2$.

7. A frequency generation system comprising the steps of
generating plural pulse trains of frequencies $f1$ and $f2$,
generating alternative output pulse trains of equal predetermined numbers of pulses of said frequencies $f1$ and $f2$,
varying the said pulse frequencies $f1$ and $f2$ in accordance with a parameter,
determining the value of $f1-f2$,
determining the value of $f1+f2$, and
applying a correction to the determined value of $f1-f2$ in accordance with the determined value of $f1+f2$.

8. A frequency generation system as set forth in claim 7, comprising the additional step of
blocking the said generation of alternate output pulse trains during the time periods within which transient effects produced by said alternate generation step exist.

9. A frequency generation system as set forth in claim 7, wherein said varying step comprises
varying inductance in accordance with said parameters to vary said pulse frequencies.

10. A frequency generation system as set forth in claim 9, wherein said applying step comprises
storing a table of values for $f1+f2$ correlated to values for correction factors for $f1-f2$,
selecting a correction factor from said table corresponding to said determined value of $f1+f2$ to apply to said determined value $f1-f2$.

11. A frequency generation system as set forth in claim 5, further comprising
a short-circuit ring means disposed between said coils.

12. A frequency generation system as set forth in claim 9, comprising the step of
short-circuiting said inductance.

* * * * *